May 14, 1957 WING H. FONG 2,792,092
COMBINED ACCELERATOR AND BRAKE CONTROL
Filed Dec. 2, 1955
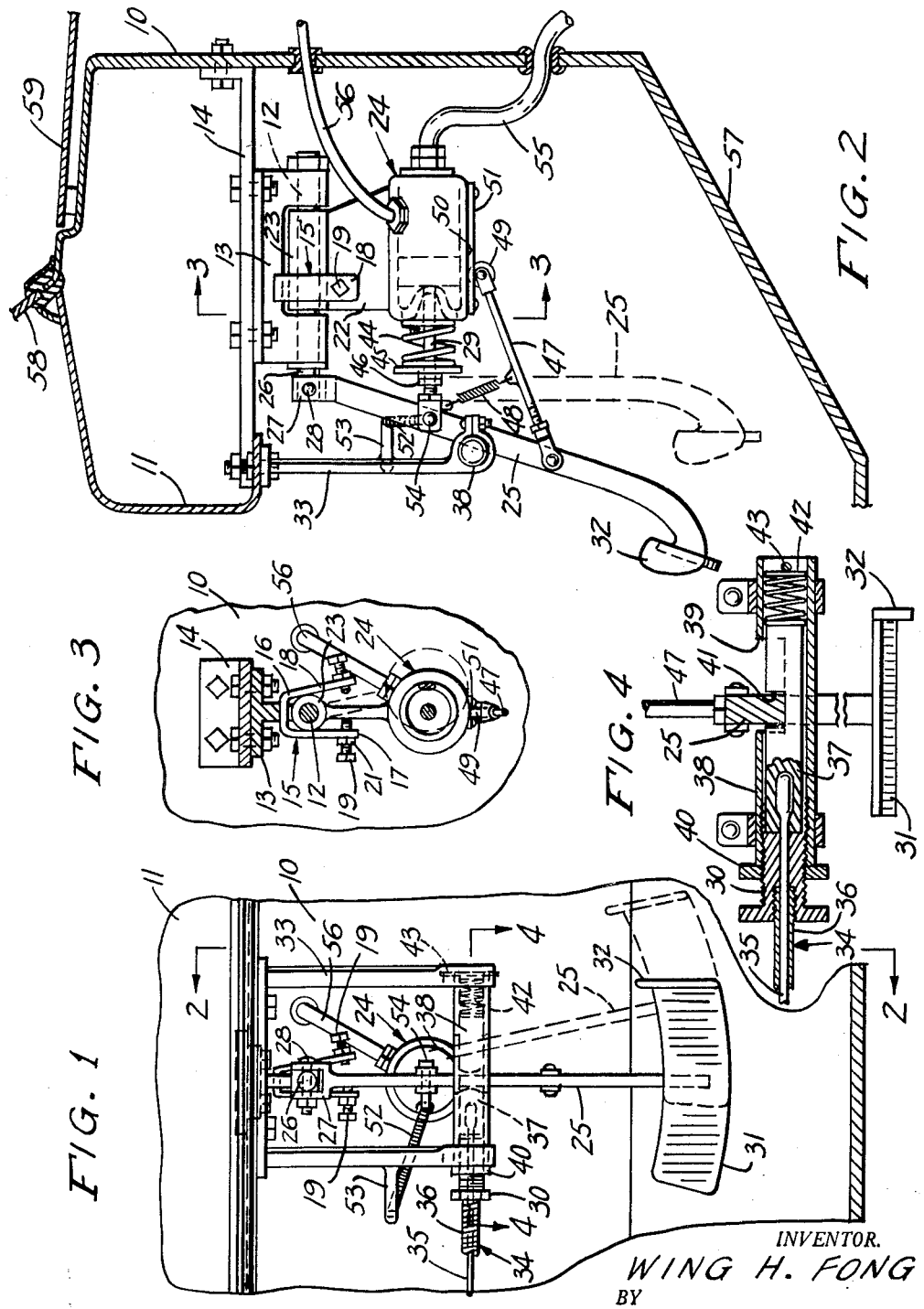
INVENTOR.
WING H. FONG
BY
McMorrow, Berman + Davidson
ATTORNEYS

2,792,092

COMBINED ACCELERATOR AND BRAKE CONTROL

Wing H. Fong, Hong Kong, China

Application December 2, 1955, Serial No. 550,747

3 Claims. (Cl. 192—3)

The present invention relates to a combined accelerator and brake control for a vehicle.

An object of the present invention is to provide a combined accelerator and brake control for a vehicle which has a single means for operating the throttle control of the vehicle engine and operating the brake-actuating mechanism of the vehicle, and one which has means for disconnecting the brake-actuating means from the throttle control when the brakes of the vehicle are applied.

Another object of the present invention is to provide a combined accelerator and brake control for a vehicle which has means enabling the operator of the vehicle to keep his foot in a comfortable and natural position while controlling the speed of the vehicle with his foot at all times in position for applying the brakes of the vehicle.

A further object of the present invention is to provide a combined accelerator and brake control for a vehicle which has means for closing the throttle of the vehicle engine to a position permitting idling speed of the engine upon the application of the vehicle brakes.

A still further object of the present invention is to provide a combined accelerator and brake control for a vehicle which is simple in structure, sturdy in construction, and one which is economical to manufacture and assemble.

These and other objects and advantages of the present invention will be fully apparent from the following description when taken in connection with the annexed drawing, in which:

Figure 1 is an elevational view of the combined accelerator and brake control of the present invention shown installed beneath the dashboard of a vehicle, Figure 2 is an elevational view taken on the line 2—2 of Figure 1, Figure 3 is a sectional view taken on the line 3—3 of Figure 2, and Figure 4 is a sectional view taken on the line 4—4 of Figure 1.

Referring in greater detail to the drawing in which like numerals indicate like parts throughout the several views, the combined accelerator and brake control of the present invention is for use with a vehicle having a fire wall 10 and an over-hanging dash 11 carried by the fire wall 10. The combined accelerator and brake control comprises a horizontally-disposed rotatable shaft 12 supported by a hanger 13 which is fixedly secured to the underside of a bracket 14 which extends between and has its ends fixedly secured to the fire wall 10 and the dash 11.

Means is operatively connected to the shaft 12 for limiting the rotation of the shaft 12 for partial rotational movement in clockwise and counterclockwise directions. Specifically, such means consists in an inverted U-shaped bar 15 having its bight 16 extending through an aperture in the intermediate portion of the hanger 13 and fixedly secured therein. The legs 17 and 18 of the bar 15 are each provided with a threaded hole in which is adjustably engaged a bolt 19 having a lock nut 21, the free end of each bolt 19 bearing against the adjacent side of the web 22 which connects the sleeve 23 circumposed and fixedly secured to the shaft 12 to the upper side of a brake-actuating hydraulic cylinder assembly 24. Bolts 19 limit the swinging movement of the web 22 from the full line position to the dotted line position as shown in Figure 3 and consequently limit the rotational clockwise and counterclockwise movements of the shaft 12.

A lever 24 arranged in an upright direction is positioned adjacent one end 26 of the shaft 12 and has its upper end 27 connected to the one end 26 of the shaft 12 for movement with the shaft 12. The upper end 27 of the lever 25 is bifurcated as seen in Figure 1 and receives the one end 26 of the shaft 12, the one end 26 being square. A nut and bolt assembly 28 secures the upper end 27 of the lever 25 to the one end 26 of the shaft 12 for movement with the shaft and also for pivotal independent movement about an axis normal to the shaft 12 toward and away from the shaft 12. The brake actuating hydraulic cylinder assembly 24 is positioned beneath and in parallel spaced relation with respect to the shaft 12 and is supported by the shaft 12 by means of the sleeve 23 and the connecting web 22. The brake-actuating hydraulic cylinder assembly 24 includes a piston rod or actuating element 29 projecting from one end of the assembly 24 and pivotally connected by its free end to an intermediate portion of the lever 25 for movement with the latter.

The lower end of the lever 25 carries a pedal means consisting in an arcuately-shaped plate 31 having an upstanding flange 32 on its right hand edge, flange 32 being engageable by a side of the foot for effecting the counterclockwise movement of the lever 25 and the shaft 12.

The hanger 33 is positioned below and dependingly supported by the dash 11. A horizontally-disposed throttle-control rod 34 is arranged at a right angle to the shaft 12.

The control rod 34 embodies a flexible cable 35 slidable in a sheath 36 with one end operatively connected to the throttle of the vehicle engine (not shown) and with its other end having means normally engaged by the lever 25 when the latter is in its position away from the shaft 12. This means includes a plunger 37 slidable in a sleeve 38 which is supported adjacent its ends in the lower end of the hanger 33. The sleeve 38 has an opening 39 in one side of the plunger 37 and the square cut recess 41 intermediate its ends and is positioned within the sleeve so that the intermediate portion of the lever 25 enters the opening 39 and is receivably engaged in the recess 41 when the lever 25 is in its position away from the shaft 12. The sleeve 38 connects the plunger 37 and the control rod 34 to the hanger 33 for movement with the lever 25 when the latter executes its partial clockwise and counterclockwise movement. Upon execution of the movement of the lever 25 toward the shaft 12 its intermediate portion disconnects from the recess 41 in the plunger 37 and thereby disconnects the control rod 34 from the lever 25. Other means of operatively connecting the plunger 37 to the throttle (not shown) of the engine may be employed instead of the flexible cable 35 and its sheath 36.

Spring means here shown as a coil spring 42 within the sleeve 38 adjacent to and bearing against the other end of the plunger 37 and anchored in the sleeve 38 by means of a pin 43 is operatively connected to the control rod 34 and biases the latter to a position in which it is engageable by the lever 25 when the latter executes its partial clockwise movement. The end of the sleeve 38 remote from the spring 42 has internal threads which engage external threads on a hollow adjustable coupling member 30 which is within that end of the sleeve 38 and surrounds the flexible cable 35. The sheath 36 is adjustably anchored in the outer end of the coupling member 30 by means of set screws or clamps (not shown) and the coupling member 30 may be screwed into or out of the sleeve 38 and locked by a lock nut 40 to provide an adjustment for the sliding travel of the plunger 37 so that the recess 41 may be accurately positioned to receive the intermediate portion of the lever 25.

A coil spring 44, part of the brake-actuating hydraulic cylinder assembly 24, is operatively connected to the lever 25 by means of an abutment plate 45 and a set of adjusting nuts 46 upon the threaded end of the actuating element 29 and biases the lever 25 to its position away from the shaft 12. The position of the lever 25 away from the shaft 12 is shown in full lines in Figure 2 and its position towards the shaft 12 is shown in dotted lines in that figure.

Means is provided for making the movement of the lever 25 towards the shaft 12 discernible to the operator of the vehicle and to enable him to distinguish between merely resting his foot upon pedal plate 31 and actively pressing his foot upon the plate 31 in a brake-actuating movement. Such means embodies a push rod 47 sloping upwardly and having its lower end pivotally connected to a lever 25 below the point of engagement of the lever 25 with the recess in the plunger 37. A spring 48 biases the push rod 47 upwardly and the upper end of the latter carries a wheel 49 rollable in a trackway 51 adjustably secured to the under side of the hydraulic cylinder assembly 24.

The trackway 51 has an inverted recess 50, shown in dotted lines in Figure 2, into which the wheel 49 rises under action of the spring 48 when the wheel 49 is at the limit of its movement forwardly. When the operator of the vehicle presses his foot on the pedal plate 31, the resistance to movement of the wheel 49 as it moves out of the recess 50 will be easily felt by the operator's foot.

A spring 52 has one end secured to the free end of a post 53 which projects from the one leg of the hanger 33 intermediate the ends of the latter and has its other end connected to one end of the pivot pin 54 which forms the pivotal connection of the actuating element 29 with the lever 25. The spring 52 biases the lever to its full line position as seen in Figure 1 and permits its movement to the dotted line position shown in that figure, the dotted line position indicating the movement of the lever necessary to move the control rod 34 in the direction in which the throttle of the engine is opened.

The spring 42 within the sleeve 38 is one means by which the control rod 34 is returned to the position in which the throttle of the engine is closed and permits the engine to operate at idling speed. Other means for closing the throttle and returning the operating rod 34 to its position in which the throttle is closed may be used in place of the spring 42.

In operation, the driver of the vehicle rests his foot lightly upon the plate 31 on the lower end of the lever 25 with the side of his foot engaging the flange 32 and with his heel on the floor of the vehicle. Acceleration and deceleration of the vehicle is accomplished by the operator pivotally moving his foot from one side to the other with his heel as a fulcrum, movement to the right serving to open the throttle of the vehicle and to accelerate the same and movement to the left decelerating the vehicle. Downward pressure of the foot against the plate 31 causes the lever 25 to move toward the shaft 12 and actuates the brake-actuating hydraulic cylinder assembly 24 and results in the application of the brakes of the vehicle. Upon release of presure against the plate 31, the lever 25 will return to its position in which its intermediate portion again reengages the plunger 37, the spring 52 pulling the lever 25 to the position in which the intermediate portion of the lever 25 is received within the recess 41 in the plunger 37.

A flexible conduit 55 connects the hydraulic cylinder assembly 24 to the brake mechanism within each of the wheels of the vehicle and another flexible conduit 56 extends through the fire wall 10 and permits the connection of the hydraulic cylinder assembly 24 to a source or reservoir of hydraulic fluid (not shown). While here illustrated and described as being supported beneath the dash 11 of a vehicle and above the floor 57 of the same, a portion of the windshield of the vehicle being indicated by the reference numeral 58 and a portion of the hood of the vehicle being indicated by the reference numeral 59, the combined accelerator and brake control of the present invention may be otherwise mounted as desired within a vehicle.

What is claimed is:

1. For use with a vehicle having a fire wall and an overhanging dash carried by said fire wall, a combined accelerator and brake control comprising a horizontally disposed rotatable shaft adapted to be positioned below and dependingly supported by said dash, means operatively connected to said shaft for limiting the rotation of said shaft for partial rotational movement in clockwise and counterclockwise directions, a lever arranged in an upright direction positioned adjacent one end of said shaft and having its upper end connected to said one end of said shaft for movement with said shaft and for independent movement about an axis normal to said shaft toward and away from said shaft, a brake-actuating hydraulic cylinder assembly including an actuating element positioned beneath and in parallel spaced relation with respect to said shaft and supported by said shaft and having the actuating element connected to an intermediate portion of said lever for movement with the latter, pedal means carried by the lower end of said lever, a hanger adapted to be positioned below and dependingly supported by said dash, and a horizontally-disposed throttle-control rod arranged at a right angle to said shaft and normally engaged by said lever when the latter is in its position away from said shaft, said control rod being supported by said hanger for movement with said lever when the latter executes its partial clockwise and counterclockwise movements and being disconnectible from said lever when the latter executes its movement toward said shaft.

2. For use with a vehicle having a fire wall and an overhanging dash carried by said fire wall, a combined accelerator and brake control comprising a horizontally disposed rotatable shaft adapted to be positioned below and dependingly supported by said dash, means operatively connected to said shaft for limiting the rotation of said shaft for partial rotational movement in clockwise and counterclockwise directions, a lever arranged in an upright direction positioned adjacent one end of said shaft and having its upper end connected to said one end of said shaft for movement with said shaft and for independent movement about an axis normal to said shaft toward and away from said shaft, a brake-actuating hydraulic cylinder assembly including an actuating element positioned beneath and in parallel spaced relation with respect to said shaft and supported by said shaft and having the actuating element connected to an intermediate portion of said lever for movement with the latter, pedal means carried by the lower end of said lever, a hanger adapted to be positioned below and dependingly supported by said dash, a horizontally-disposed throttle-control rod arranged at a right angle to said shaft and normally engaged by said lever when the latter is in its position away from said shaft, said control rod being supported by said hanger for movement with said lever when the latter executes its partial clockwise and counterclockwise movements and being disconnectible from said lever when the latter executes its movement toward said shaft, and spring means operatively connected to said control rod biasing the latter to a position in which it is engageable by said lever when the latter executes its partial clockwise movement.

3. For use with a vehicle having a fire wall and an overhanging dash carried by said fire wall, a combined accelerator and brake control comprising a horizontally disposed rotatable shaft adapted to be positioned below and dependingly supported by said dash, means operatively connected to said shaft for limiting the rotation of said shaft for partial rotational movement in clockwise and counterclockwise directions, a lever arranged in an upright direction positioned adjacent one end of said shaft and having its upper end connected to said one end of said shaft for movement with said shaft and for independent movement about an axis normal to said shaft toward and away from said shaft, a brake-actuating hydraulic cylinder assembly including an actuating element positioned beneath and in parallel spaced relation with respect to said shaft and supported by said shaft and having the actuating element connected to an intermediate portion of said lever for movement with the latter, pedal means carried by the lower end of said lever, a hanger adapted to be positioned below and dependingly supported by said dash, a horizontally-disposed throttle-control rod arranged at a right angle to said shaft and normally engaged by said lever when the latter is in its position away from said shaft, said control rod being supported by said hanger for movement with said lever when the latter executes its partial clockwise and counterclockwise movements and being disconnectible from said lever when the latter executes its movement toward said shaft, and spring means operatively connected to said lever biasing the latter to its position away from said shaft.

References Cited in the file of this patent
UNITED STATES PATENTS

| | | |
|---|---|---|
| 2,181,883 | Gibson | Dec. 5, 1939 |
| 2,452,981 | Benning | Nov. 2, 1948 |

FOREIGN PATENTS

| | | |
|---|---|---|
| 736,549 | Great Britain | Sept. 7, 1955 |